US012350214B2

(12) United States Patent
Bossé

(10) Patent No.: US 12,350,214 B2
(45) Date of Patent: Jul. 8, 2025

(54) DRIVE SYSTEM FOR PATIENT LIFT

(71) Applicant: Arjo IP Holding Aktiebolag, Malmö (SE)

(72) Inventor: Joël Bossé, Sherbrooke (CA)

(73) Assignee: ARJO IP HOLDING AKTIEBOLAG, Malmö (SE)

(*) Notice: Subject to any disclaimer, the term of this patent is extended or adjusted under 35 U.S.C. 154(b) by 140 days.

(21) Appl. No.: 18/021,471

(22) PCT Filed: Aug. 16, 2021

(86) PCT No.: PCT/EP2021/072703
§ 371 (c)(1),
(2) Date: Feb. 15, 2023

(87) PCT Pub. No.: WO2022/038084
PCT Pub. Date: Feb. 24, 2022

(65) Prior Publication Data

US 2023/0329941 A1 Oct. 19, 2023

(30) Foreign Application Priority Data

Aug. 17, 2020 (SE) .................................... 2050957-6

(51) Int. Cl.
*A61G 7/10* (2006.01)

(52) U.S. Cl.
CPC ......... *A61G 7/1065* (2013.01); *A61G 7/1073* (2013.01); *A61G 2203/70* (2013.01)

(58) Field of Classification Search
CPC ................ A61G 7/1065; A61G 7/1073; A61G 2203/70; A61G 7/1071; A61G 7/1015;
(Continued)

(56) References Cited

U.S. PATENT DOCUMENTS 4,372,452 A 2/1983 McCord
6,085,368 A * 7/2000 Robert ................. A61G 7/1015 74/400

(Continued)

FOREIGN PATENT DOCUMENTS

CN 1269476 A 10/2000
CN 1325362 A 12/2001

(Continued)

OTHER PUBLICATIONS

International Search Report and Written Opinion dated Mar. 14, 2022, issued in corresponding Patent Application No. PCT/EP2021/072703.

(Continued)

*Primary Examiner* — Madison Emanski

(74) *Attorney, Agent, or Firm* — Morgan, Lewis & Bockius LLP

(57) ABSTRACT

A drive system (100) for a patient lift. The drive system comprises a drum (321) configured to control the vertical movement of a patient support mounting device (11) of the patient lift via a load bearing member (12), at least one motor (270) adapted to drive the drum (321), each motor (270) being connected to an motor shaft gear (227), and a transmission (228) connecting the motor (270) and the drum (321), the transmission (228) being adapted to transfer torque from the motor (270) to the drum (321).

21 Claims, 8 Drawing Sheets

(58) Field of Classification Search
CPC .. A61G 7/1042; A61G 7/1044; A61G 7/1051; A61G 7/1061; A61G 2200/34; A61G 2200/32; A61G 7/1046; A61G 7/1019; A61G 2203/12; A61G 7/1055; A61G 2203/44; A61G 7/1076; A61G 2203/40; A61G 2203/726; A61G 2203/10; A61G 2203/30; A61G 7/1013; A61G 7/1049; B66D 3/20; B66D 2700/025; B66D 1/16; B66D 3/18; B66D 3/00; B66D 3/26; B66D 1/14; B66D 1/54; A63B 2022/0094; A61H 2201/5061; A61H 2201/5064; A61H 2201/5079; A61H 2201/5084; A61H 2201/5097; A61H 3/008; A61H 2201/5092; B63B 2022/5092
USPC .......... 5/81.1 R, 83.1, 85.1, 87.1, 86.1, 89.1, 5/81.1 C; 177/144, 147
See application file for complete search history.

(56) References Cited

U.S. PATENT DOCUMENTS

| | | | |
|---|---|---|---|
| 6,241,215 | B1 | 6/2001 | Gersemsky et al. |
| 6,460,828 | B1 | 10/2002 | Gersemsky et al. |
| 2005/0115914 | A1 | 6/2005 | Chepurny |
| 2006/0253977 | A1 | 11/2006 | Hjort |
| 2019/0021922 | A1 | 1/2019 | Paul et al. |
| 2020/0085659 | A1 | 3/2020 | Tari et al. |
| 2020/0138657 | A1 | 5/2020 | Chandan et al. |

FOREIGN PATENT DOCUMENTS

| | | | |
|---|---|---|---|
| CN | 204627210 | U | 9/2015 |
| CN | 205459532 | U | 8/2016 |
| CN | 106230325 | A | 12/2016 |
| DE | 9109343 | U1 | 11/1991 |
| DE | 4126402 | A1 | 2/1993 |
| EP | 1 452 478 | A | 9/2004 |
| JP | 2005-186192 | A | 7/2005 |

OTHER PUBLICATIONS

Office Action issued on Sep. 7, 2024 in Chinese Patent Application No. 202180055444.3 with English translation.

* cited by examiner

DRIVE SYSTEM FOR PATIENT LIFT

TECHNOLOGY FIELD

The present invention relates to a drive system for a patient lift. The present invention further relates to a patient lift comprising such a drive system. Further the present invention relates to a method for controlling a torque exerted by each of at least two motors comprised in a drive system.

BACKGROUND

Patient lifts, also referred to as patient hoists, are commonly used to raise, lower and transfer patients who are disabled or who otherwise have mobility problems. Two common types of patient lifts are stanchion-mounted lifts, also known as floor lifts. and ceiling lifts. Floor lifts often have a hoist assembly which may be disposed at the upper end of a stanchion. The stanchion has a wheeled base, which allows for the lift to be moved along the ground to different locations.

A lifting member which may be in the form of a spreader bar, such as a two-point attachment spreader bar, a three-point attachment spreader bar, a four-point attachment spreader bar, a five-point attachment spreader bar or a powered spreader bar for adjusting the angle of the spreader bar, for supporting a patient harness or sling descends from the hoist assembly on a strap or a cable. The strap or cable is wound around a motorized drum for raising and lowering the patient harness or sling.

For example, the lift might be wheeled to position the hoist assembly and lifting member over or adjacent to a patient. The lifting member may then be lowered to receive the patient and subsequently raise the lifting member and patient so that they may be wheeled elsewhere to be lowered and placed. A ceiling lift may be utilized in a similar manner, however the hoist assembly is movably engaged to ceiling-mounted tracks such that the hoist assembly can be moved about the track from location to location.

A ceiling lift may be described as a motor unit movable along a rail, a flexible member is attached to a spreader bar. The motor unit commonly comprises a transmission, batteries and a control module.

The transmission is subjected to a number of challenges. For example, the transmission needs to be able to lift a patient, maintain the patient at a prescribed height for a certain period of time and lower the patient. Further, the transmission needs to be able to lift and support a weight of around 450 Kg.

In order to support such large weights, large motors capable of providing a high amount of torque are often used. Such motors may handle even heavy loads. However, large motors are usually expensive and consumes a lot of power.

To save cost and power, some manufacturers uses smaller motors able to deliver a high RPM. In order for the smaller motors to be able to support and lift higher loads, the RPM is often reduced and torque increased by means of different types of transmissions.

Such transmission systems are often complex and space consuming. Furthermore, due to the reliance on a fix transmission system, the motor unit may lack flexibility in terms of it being adaptable to different application, i.e. different types of patient lifts. In the light of the above, there is a need for a transmission system which is associated with a low cost and high efficiency as well as flexibility.

SUMMARY

According to one aspect a drive system is provided. The drive system is for a patient lift. The drive system comprises a drum configured to control the vertical movement of a patient support mounting device of the patient lift via a load bearing member. The drive system further comprises at least one motor adapted to drive the drum, each motor being connected to an motor shaft gear via an output motor shaft.

Also, the drive system comprises a transmission connecting the motor and the drum. The transmission is adapted to transfer torque from the motor to the drum.

The transmission comprises a transmission interface adapted to interplay with the motor shaft gear. The transmission interface is configured to receive the motor shaft gear in at least two configurations. Each configuration is associated with an orientation of the output motor shaft relative the transmission interface.

According to an aspect, a patient lift is provided. The patient lift comprises the drive system, a patient support mounting device and a load bearing member. The patient support mounting device is connected to the drive system via the load bearing member.

According to an aspect, a method is provided. The method is for controlling a torque exerted by each of at least two motors comprised in a drive system. The drive system is configured to control the vertical movement of a patient support mounting device.

The method comprises obtaining a torque exerted by each of the motors, determining at least one torque differential value as a difference between the torque exerted by each of the motors and adjusting the torque exerted by at least one of the motors to compensate for the determined at least one torque differential value.

According to an aspect, a computer program product is provided. The computer program product is configured to, when executed by a control module, perform the method for controlling a torque exerted by each of at least two motors.

Further objects and features of the present invention will appear from the following detailed description of embodiments of the invention.

BRIEF DESCRIPTION OF DRAWINGS

The invention will be described with reference to the accompanying drawings, in which.

DETAILED DESCRIPTION

Figure 1A:
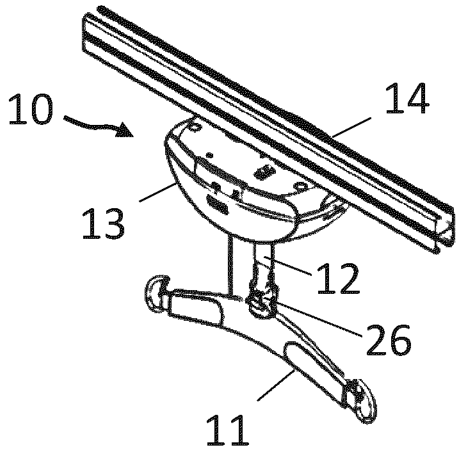
FIG. 1*a* is a perspective view of elements of a patient lift system.
Figure 1B:
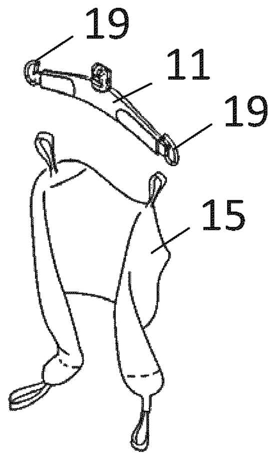
FIG. 1*b* is a perspective view of elements of a patient lift system.

FIGS. 1*a* and 1*b* show a non-limiting example of elements of a patient handling system with a patient lift. The patient lift may be in the form of a patient ceiling lift. A patient support mounting device 11 is connected via a load bearing member 12 to a lifting device 13 in FIG. 1*a*. The lifting device 13 may be arranged to be moveable along a track 14. The lifting device 13 may thus be in engagement with the track 14, e.g. movably connected to the track 14. The lifting device 13 may move along the track 14, preferably in both directions. The lifting device 13 may be in the form of a trolley movable along said track 14.

The patient lift may comprise a drive system, which will be further described with reference to FIGS. 2-7. The lifting device may comprise a drum for winding of the load bearing member 12 and motor and transmission for driving said drum. The load bearing member 12 may be wrapped around said drum for lowering and raising the patient support mounting device 11. The drive system may be comprised in the lifting device.

In one embodiment, the lifting device 13 comprises wheels for interfacing with the track 14. In one embodiment, the lifting device 13 is slidably connected to the track 14.

The patient support mounting device 11 may be a spreader bar or hanger bar. The load bearing member 12 may be a flexible member such as a strap. The patient support 15 may, as shown in FIG. 1*b*, be a sling. The patient support mounting device 11 may be connected to the load bearing member 12 by means of a connecting unit 26. The connecting unit 26 may be a quick connector, i.e. a connecting unit 26 adapted to receive the load bearing member 12 in a releasable manner.

The patient support mounting device 11 may comprise attachment elements 19 for attaching the patient support 15 to the patient support mounting device 11. The attachment elements may comprise hooks with latches.

The lifting device 13 is configured to move the patient support mounting device 11 between a raised position situated closer to said lifting device 13 and a lowered position located more distantly from said lifting device 13. The lifting device 13 may thus be configured to move the patient support mounting device 11 vertically between said raised and lowered position.

Although the patient lift in FIGS. 1*a*-1*b* is depicted as a ceiling patient lift, the patient lift may also be floor lift with a base comprising a set of wheels for moving the lift across a floor.

FIGS. 2-7 discloses aspects of embodiments of a drive system for implementation in the patient lift depicted in FIG. 1.

Figure 2:
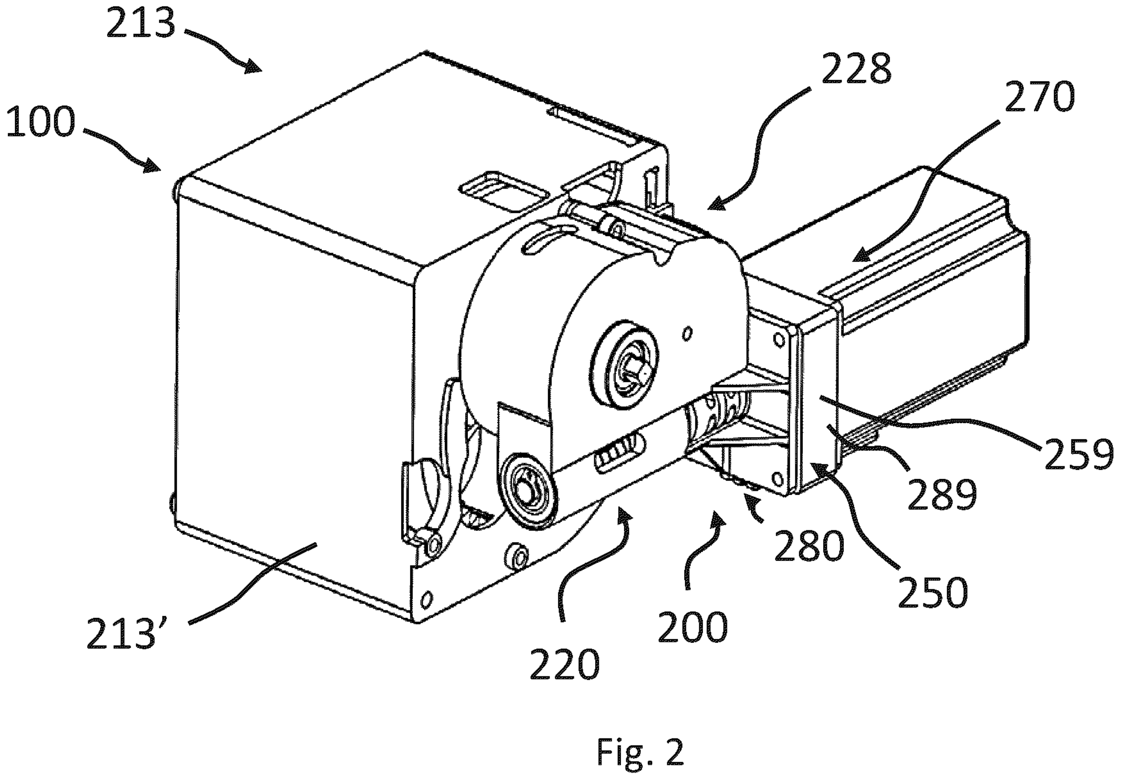
FIG. 2 depicts a drive system according to an embodiment implemented in a patient lift system.
Figure 3:
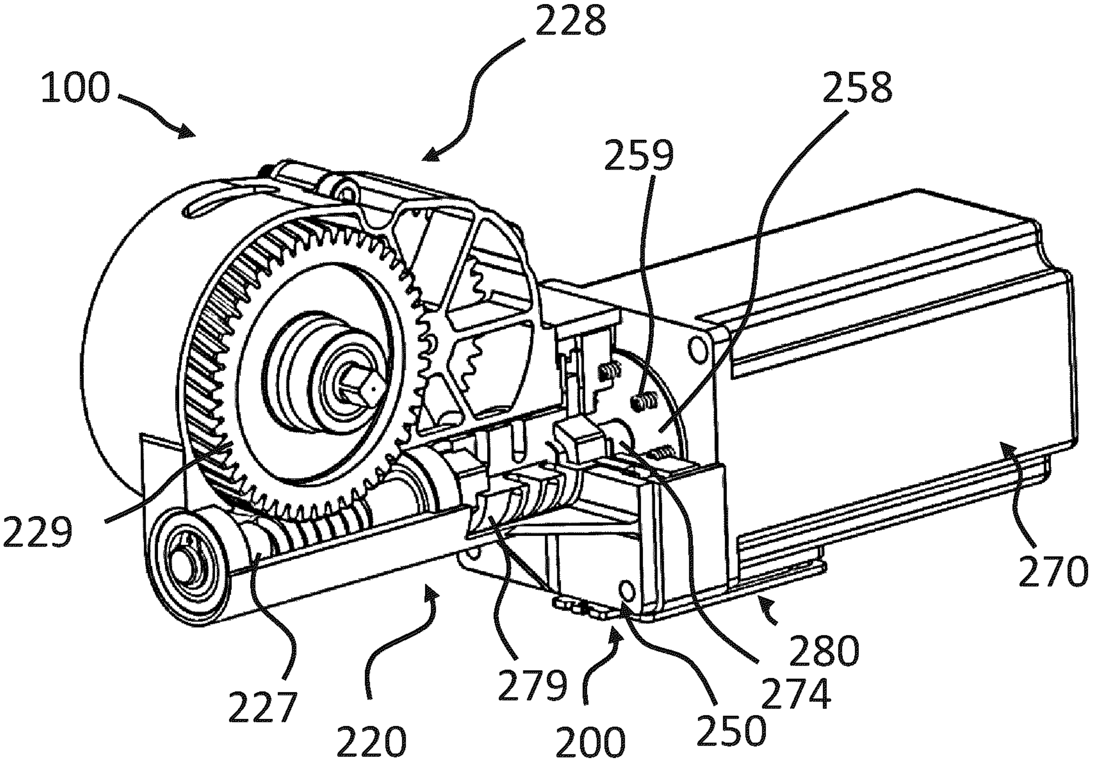
FIG. 3 is a partial longitudinal-section view of a drive system according to an embodiment.
Figure 4:
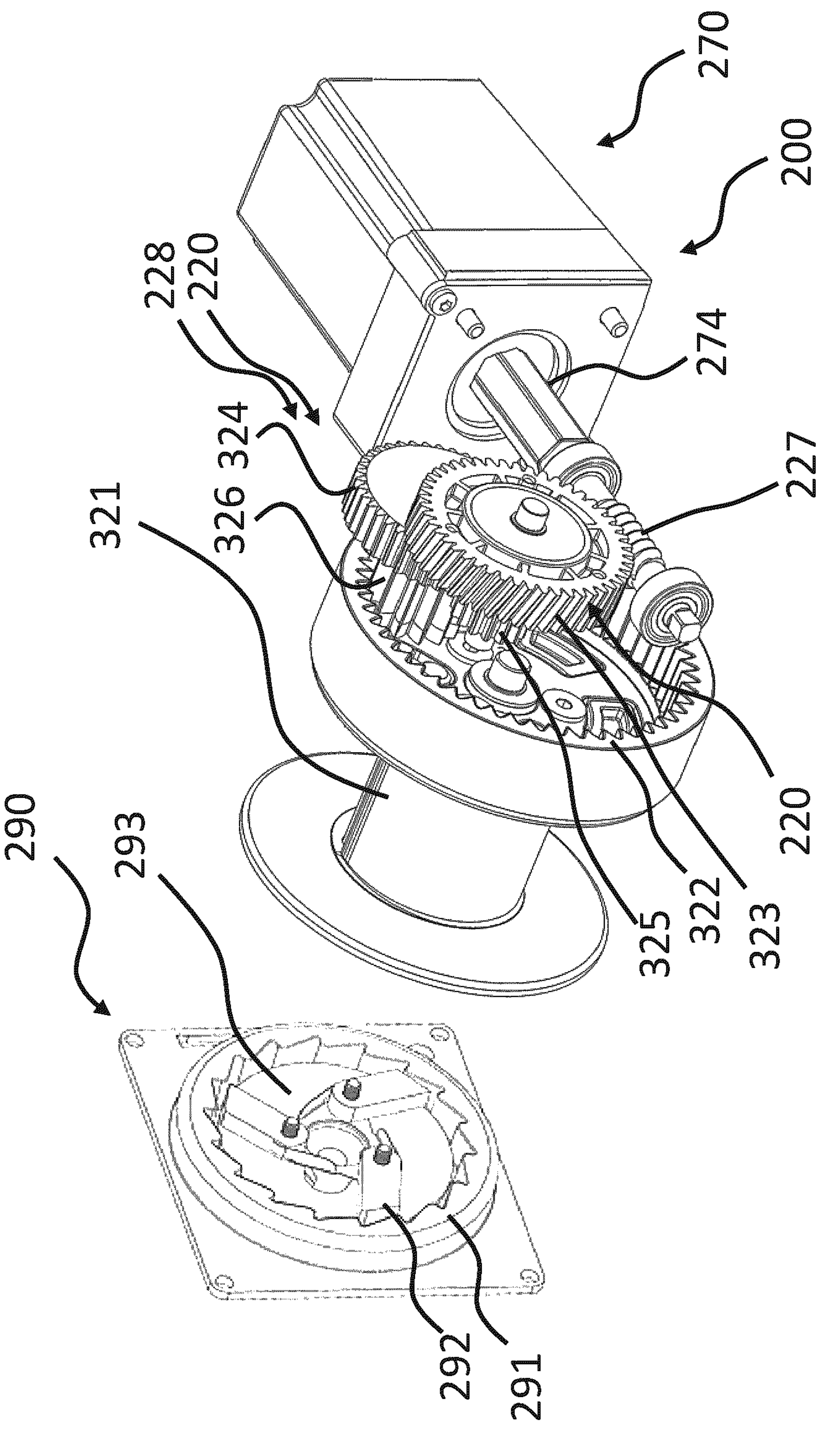
FIG. 4 is an exploded view of a drive system according to an embodiment.

FIG. 2-4 depicts a drive system according to an embodiment. The drive system 100 comprises the drum and a transmission which may be comprised inside a housing 213'. The drive system 100 thus comprises the casing 213'. The drive system 100 further comprises at least one motor 270. FIG. 3 discloses the drive system 100 without a part of the casing 213'. The transmission and a part of an output motor shaft 274 is arranged inside the casing 213'. The drive system comprises a locking arrangement 200 which will be further described with reference to FIG. 8.

FIG. 4 discloses an explosion view of the drive system. The drive system comprises the drum 321. The drum is configured to control the vertical movement of the patient support mounting device 11 via the load bearing member 12. The patient support mounting device 11 is connected to the lifting device 13, 213 via said load bearing member 12. As previously described the drum 321 is adapted to wind and unwind the load bearing member 12. Thus, the drum is adapted to be connected to the load bearing member 12. The load bearing member may be a flexible member such as a wire, cable or rope.

The drive system 100 further comprises the at least one motor 270. The at least one motor 270 is adapted to drive the drum 321. As depicted, the motor may be arranged orthogonally to the drum 321. Each of the at least one motor 270 is connected to a motor shaft gear 227 via an output motor shaft 274.

The output motor shaft 274 is arranged between the motor shaft gear 227 and the motor 270. In one embodiment, the motor shaft gear 227 is connected via to the motor 270 by means of an additional gearing. In one embodiment, the motor shaft gear 227 may be directly connected to the motor 270. Thus, the motor 270 may be directly connected to the input motor shaft, said input motor shaft comprising a gear, hence forming the motor shaft gear 227. In one embodiment, the motor shaft gear 227 may be connected to an input shaft directly connected to the motor.

The drive system comprises the transmission 228. The transmission 228 connects the motor 270 and the drum 321. Thus, the motor 270 and the drum 321 are connected by means of the transmission 228. The transmission 228 is adapted to transfer torque from the motor 270 to the drum 321.

The transmission 228 comprises a transmission interface 220. The transmission interface 220 is adapted to interplay with the motor shaft gear 227. In other words, the transmission interface is adapted to interplay with the motor shaft gear 227 such that the drum 321 is driven by the motor 270.

The transmission 228 comprises a transmission interface 220. The transmission interface 220 is adapted to interplay with the motor shaft gear 227. The transmission interface 220 is configured to receive the motor shaft gear 227 in at least two configurations. Each configuration is associated with an orientation of the output motor shaft 274 relative the transmission interface 220.

In the field of patient lifts, the requirements on the drive system may vary greatly depending on the application of the patient lift and the weight and mobility of the patient to be carried by the patient lift. The transmission potentially being able to receive torque from the at least one motor in more than one manner, i.e. configuration enables a modular solution where more than one motor may be utilised or the positioning of the motor may be altered depending on the available space. Thus, a drive system which allows for an increased flexibility in terms of usage is achieved.

A configuration is herein defined as a position in which the motor shaft gear 227 interfaces with the transmission interface 220. Consequently, the position of the motor shaft gear 227 relative the transmission interface 220 is provided by means of a corresponding orientation (i.e. direction and position) of the output motor shaft 274 relative the transmission interface 220.

The transmission interface 220 thus is adapted to be in direct engagement with the motor shaft gear 227, i.e. adapted to be directly connected to the motor shaft gear 227.

The transmission interface 220 may be in the form of one or multiple gears or a belt drive wheel etc.

In one embodiment, the transmission interface 220 comprises an input transmission gear. The input transmission gear 323 is adapted to interplay with the motor shaft gear 227.

In one embodiment, wherein the drive system 100 comprises more than one motor 270, the input transmission gear 323 is adapted to interplay with a first motor shaft gear 227 connected to the first motor and a second motor shaft gear 227 connected to the second motor. This allows for a drive system which is simple to install and is space efficient as well as less complex compared to other modular drive systems for patient lifts.

In another embodiment, the transmission interface 220 may comprise a plurality of input transmission gears 323. Thus, a first input transmission gear 323 may be adapted to interplay with the first motor shaft gear 227 connected to the first motor 270. A second input transmission gear 323 may be adapted to interplay with the second motor shaft gear 227 connected to the second motor 270.

In one embodiment, the input transmission gear 227 may be arranged orthogonally to the drum 321. Thus, the engaging portion of the input transmission gear 227 may extend orthogonally to the drum 321. As depicted in FIG. 4, the input transmission gear may be a cogged wheel. The periphery of the cogged wheel may thus extend orthogonally to the drum 321.

Further referencing FIG. 4, the motor shaft gear 227 and the input transmission gear may form a worm drive. As is well-known for the skilled person, a worm drive is formed by a worm gear and a worm wheel. The worm wheel is arranged orthogonal to the worm gear.

In one embodiment, the motor shaft gear 227 may be a worm gear. The input transmission gear 323 may thus be a worm wheel. In one embodiment, motor shaft gear 227 may be arranged orthogonal to the input transmission gear 323. This allows for the input transmission gear 323 to receive the motor shaft gear 227 in different configuration in a space efficient and non-complex manner.

In an alternative embodiment, the motor shaft gear 227 may be a worm wheel and the input transmission gear 323 may thus be a worm gear.

The transmission 228 may further comprise an output gear 322. The output gear 322 is fix to the drum 321. The output gear 322 is connected to the transmission interface 220 for receiving torque from the motor shaft hear 227. Thus, the output gear is arranged between the transmission interface 220 and the drum 321 for transferring torque between said transmission interface 220 and drum 321.

The output gear 322 may comprise a ring wheel. The ring wheel is fix to the drum 321. Thus a more compact drive system is achieved.

The output gear 322 may be coaxial with the drum 321.

In one embodiment, the ring wheel may be an integrated part of the drum 321.

In one embodiment, the transmission 228 may comprise a planetary gear wheel 326. The planetary gear wheel 326 interfaces with the ring wheel 322. The planetary gear wheel 326 is arranged between the transmission interface 220 and the ring wheel 322.

Figure 5A:
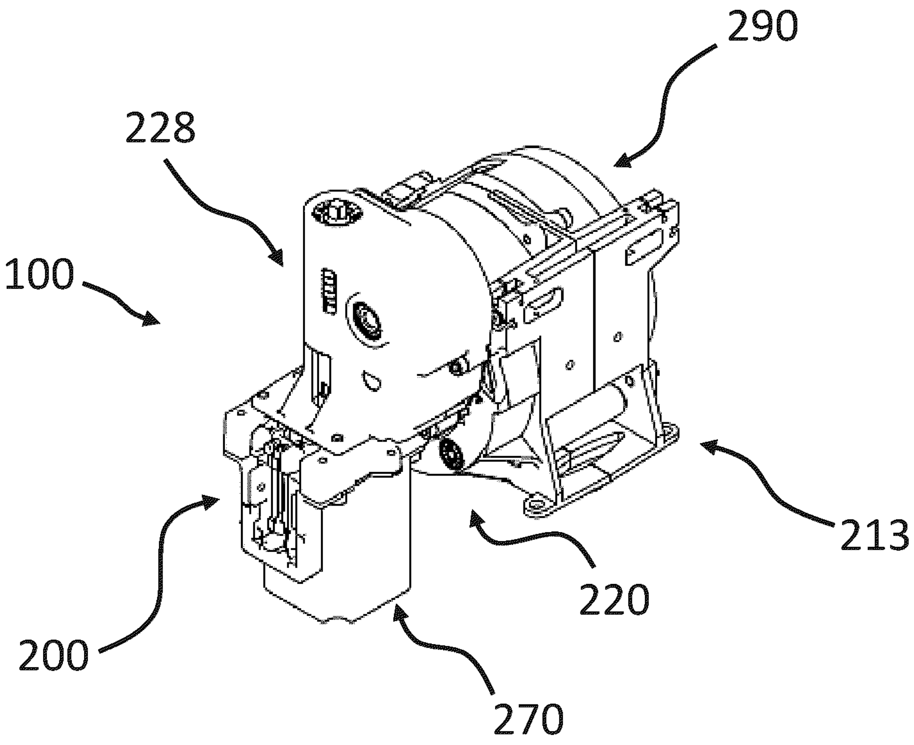
FIG. 5*a* is a perspective view of a drive system according to an embodiment.
Figure 5B:
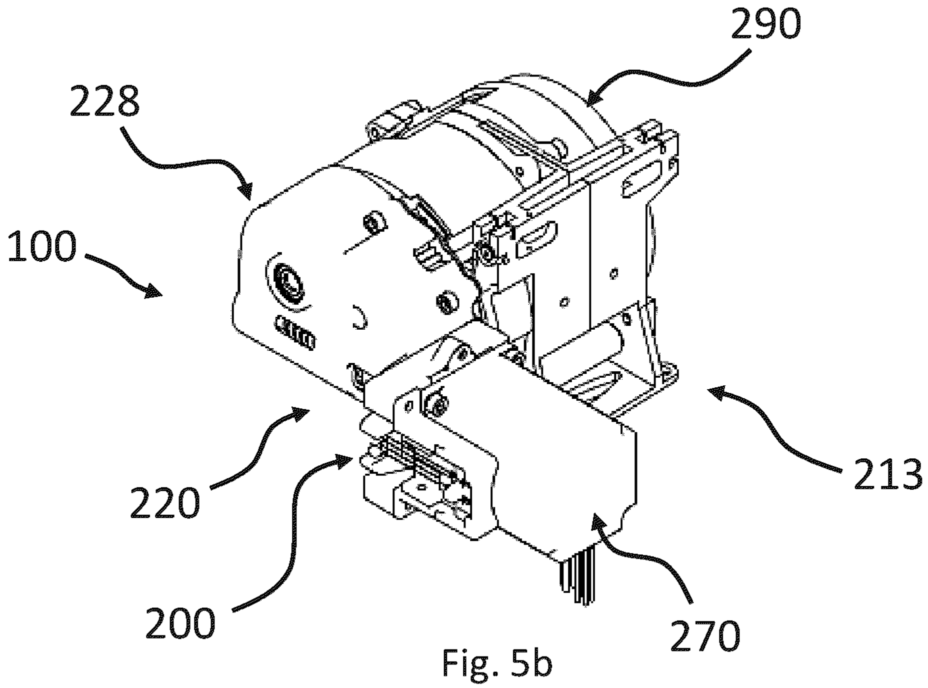
FIG. 5*b* is a perspective view of a drive system according to an embodiment.
Figure 5C:
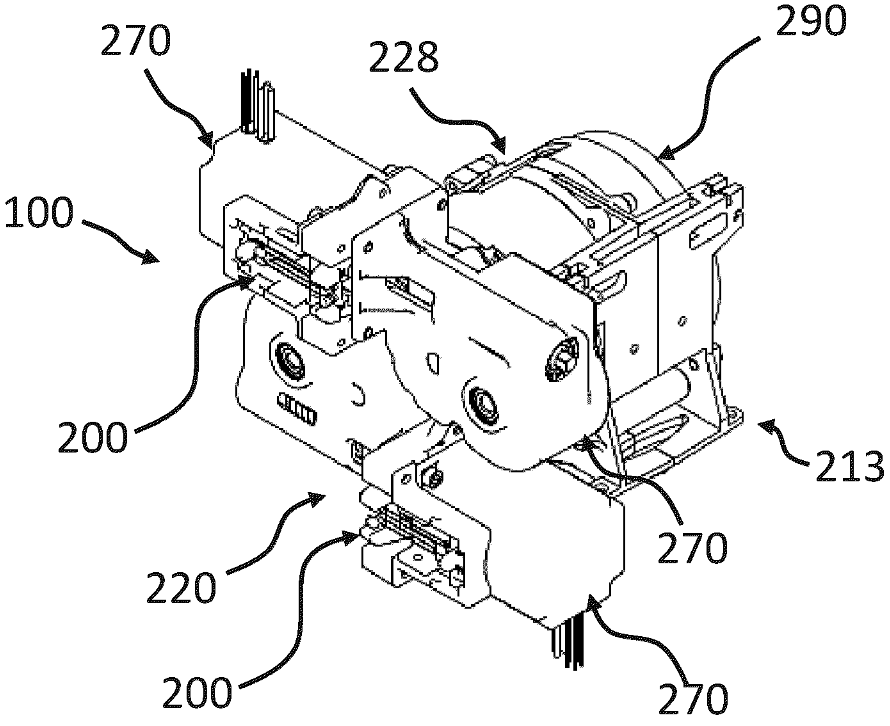
FIG. 5*c* is a perspective view of a drive system according to an embodiment.

FIG. 5*a-c* depicts various embodiments of the drive system. As seen in the figures the transmission interface 220 is configured to receive the motor shaft gear 227 in at least two configurations. Each configuration is associated with an orientation of the output motor shaft 274 relative the transmission interface 220.

FIG. 5*a* depicts a drive system wherein transmission interface 220 receives the motor shaft gear in one of the configurations of the at least two configurations. The output motor shaft 274 may have an orientation which is orthogonal to the drum 321 in the at least two configurations. As seen in said FIG. 5*a*, the orientation of the output motor shaft 274 associated with the depicted configuration of the transmission interface and motor shaft gear is substantially orthogonal to the drum.

In an alternative embodiment, the orientation of the output motor shaft 274 may have any other orientation relative the transmission interface 220, however such a solution requires additional gearings and is less beneficial.

FIG. 5*b* depicts a drive system wherein the transmission interface 220 receives the motor shaft gear in another one of the at least two configurations. As seen in said FIG. 5*b*, the output motor shaft 274 is oriented orthogonal in one of the configurations relative to output motor shaft 274 in another one of the configuration. Thus, a first configuration depicted in FIG. 5*a* is associated with an orientation of the output motor shaft which is orthogonal relative the orientation of the output motor shaft, the second configuration being associated with said orientation of the output motor shaft.

FIG. 5*c* depicts a drive system comprising two motors. The input motor gear shaft 227 of the first motor has a first orientation and the input motor gear shaft 227 of the second motor has a second orientation. The orientation of the input motor gear shafts are substantially parallel. Thus, the output motor shaft 274 is oriented parallel in one of the configurations relative to the output motor shaft 274 in another one of the configurations. Accordingly, the transmission interface 220 is configured to receive the motor shaft gear 227 in at least two configurations. One of the at least two configurations is associated with an orientation of the output motor shaft 274. The other one of the at least two configurations is associated with an orientation of the output motor shaft 274, said orientation being parallel to the orientation of the output motor shaft in the first output motor shaft 274. Albeit the drive system of FIG. 5*c* is illustrated as comprising two locking arrangements 200, it should be mentioned that this is but one embodiment, and a drive system comprising two motors 270 may very well be formed without any, or only one, locking arrangement 200. For example, only one motor 270 may be provided with a locking arrangement 200. A second motor 270 may instead be provided with spacers to replace said locking arrangement 200. A single locking arrangement 200 provided on one of the motors may thus be utilized to brake a drive system comprising a plurality of motors by means of locking the motor shaft gear connected to said one of the motors.

The drive system may comprise a first and second motor 270. The transmission interface 220 is thus adapted to interplay with a first motor shaft gear 227 connected to the first motor 270 and a second motor shaft gear 227 connected to the second motor 270. The first motor shaft gear 227 is connected to the first motor 270 via the first output motor shaft 274. The second motor shaft gear 227 is connected to the second motor 270 via the second output motor shaft 274. The transmission interface 220 is adapted to interplay with the first motor shaft gear 227 connected to the first motor 270. The transmission interface 220 is further adapted to interplay with the second motor shaft gear 227 connected to the second motor 270.

Having two motors for driving and controlling the drum is associated with a number of advantages. It allows for usage of smaller motors instead of one larger to provide a high torque to the drum. Furthermore, having smaller motors allows usage of cheaper motors. Also, having two motors allows for a modular system where smaller electric components such as circuit boards may be used for multiple applications. Having singular large electronic motors requires larger electric components, which may not be suitable for every implementation.

In one embodiment, the first motor shaft gear 227 and the second motor shaft gear 227 are parallel. Thus, the transmission interface 220 receives the first and second motor shaft gear 227 in configurations associated with a first and second orientation of the first and second output motor shaft 274, respectively. The first orientation being parallel to the second orientation. This allows for implementation of two motors in a space efficient manner.

In one embodiment, the first and second orientation may be parallel and opposite. Thus, the first output motor shaft may extend in a direction opposite to the second output motor shaft.

In one embodiment, the first and second orientation may be parallel and in the same direction. Thus, the first output motor shaft may extend in the same direction and parallel to the second output motor shaft.

The first motor 270 may be arranged at a first side relative the transmission interface 220 and the second motor 270 may be arranged at a second side relative the transmission interface 220. The second side may be opposite to the first side.

Figure 6C:
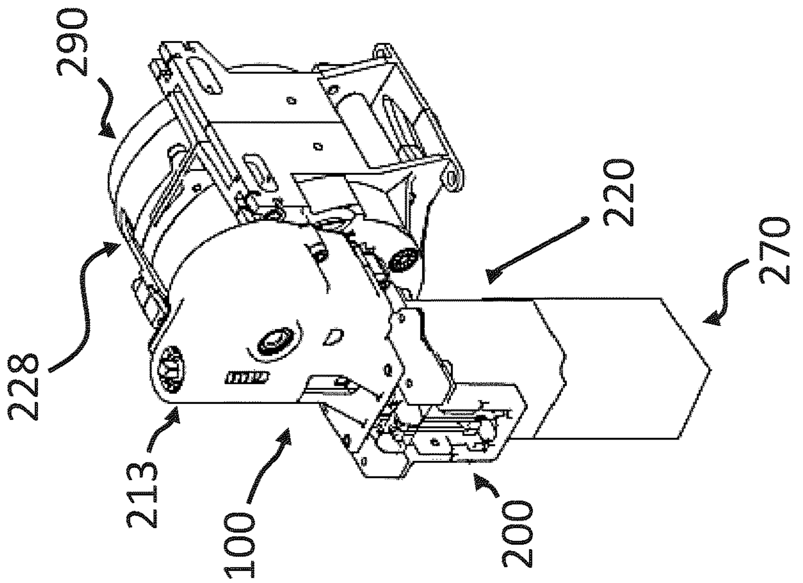
FIG. 6*c* is a perspective view of a drive system according to an embodiment.
Figure 6B:
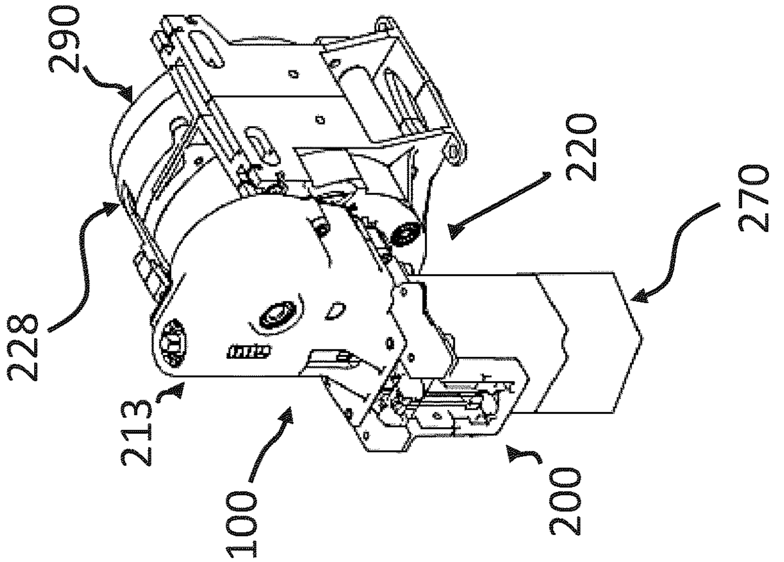
FIG. 6*b* is a perspective view of a drive system according to an embodiment.
Figure 6A:
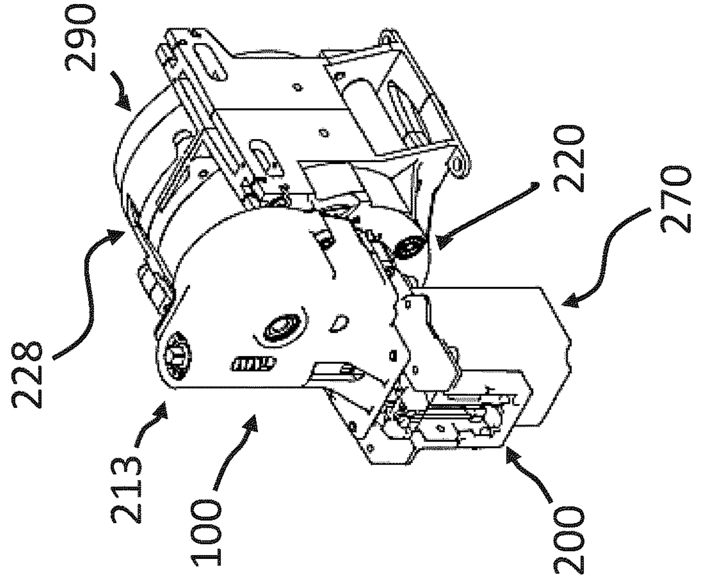
FIG. 6*a* is a perspective view of a drive system according to an embodiment.

With reference to FIG. 6*a-c*, the motor 270 may have different sizes and capacity. Thus the transmission interface 220 may be adapted to interchangeably receiving the input motor gear shaft 227 connected to the motor 270. This allows for a drive system which may be implemented in a wide array of patient lifts due to flexibility of the system. Hence, the motor 270, the output motor shaft 274 and the motor shaft gear 227 may be arranged to form a motor module. The transmission interface 220 may be adapted to interchangeably receiving the motor module.

Figure 7:
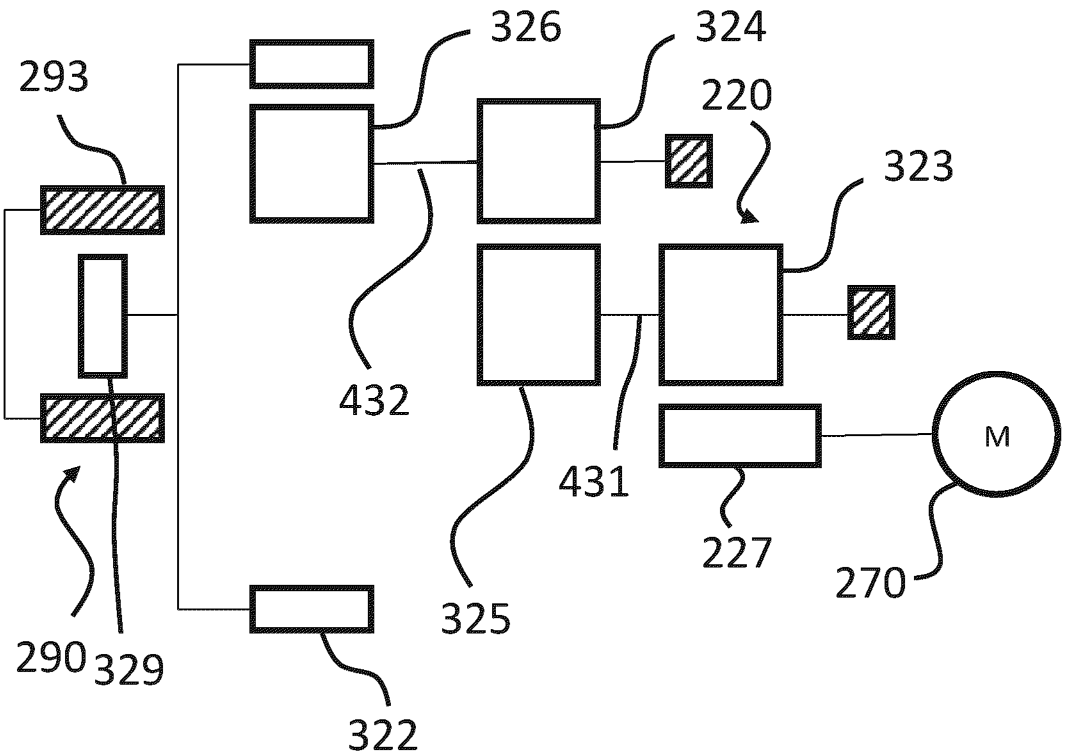
FIG. 7 is a schematic view of the drive system according to an embodiment.

FIG. 7 schematically depicts the drive system according to an embodiment in further detail.

The motor shaft gear 227 interfaces with the transmission interface. The transmission interface 220 comprises the input transmission gear 323.

The transmission 228 may comprise a first gear 325 connected to the input transmission gear 323. The first gear 325 may be coaxial to the input transmission gear. In one embodiment, the first gear 325 may be coaxial to the ring wheel 322. In one embodiment, the first gear 325, the input transmission gear 323 and the ring wheel 322 may be coaxial. The coaxial design of the transmission allows for a more compact transmission which enables sufficient torque transfer to the drum.

The transmission 228 may comprise an input transmission shaft 431. The input transmission shaft 431 being arranged to transfer torque from the input transmission gear 323 to the first gear 325. The first gear 325 and the input transmission gear 323 may both be mounted to the input transmission shaft 431.

The first gear 325 may be connected to the ring wheel 322 via an intermediate gearing. The intermediate gearing is adapted to transfer torque from the first gear 325 to the ring wheel 322.

In one embodiment, the intermediate gearing comprises a first intermediate gear 324. The first intermediate gear 324 interfaces with the first gear 325.

The intermediate gearing may further comprise a second intermediate gear 326. The second intermediate gear 326 may be connected to the first intermediate gear 324. The second intermediate gear 326 may be adapted to transfer torque from the first intermediate gear 324 to the ring wheel 322. In one embodiment, the first and second intermediate gear may be coaxial. In one embodiment, the second intermediate gear 326 may interface with the ring wheel 322.

In one embodiment, the intermediate gearing comprises an intermediate shaft 432. The intermediate shaft 432 may be adapted to transfer torque from the first intermediate gear 324 to the second intermediate gear 326. The first and second intermediate gear may be mounted to the intermediate shaft 432.

Further referencing FIG. 7, the brake element 329 may be fixedly mounted to the ring wheel 322 and/or the drum 321. The brake element 329 may be coaxial with the ring wheel 322. In one embodiment, the brake element 329 may be coaxial with the any or all of the input transmission gear 323, the first gear 325 and the intermediate shaft 431.

In one embodiment, the transmission 228 may comprise a planetary gearing. Thus, the first gear 325 may be a sun gear of the planetary gearing. Further, the intermediate gearing may comprise a planet gear. In one embodiment, the first intermediate gear 324 is a planet gear interfacing with the sun gear, i.e. the first gear 325.

In one embodiment, at least one motor 270 of the at least one motor 270 is provided with the locking arrangement 200. The locking arrangement 200 is configured to selectively lock the motor shaft gear 227.

In one embodiment, each motor 270 of the at least one motor 270 may be provided with the locking arrangement 200. The locking arrangement 200 is configured to selectively lock the motor shaft gear 227.

Figure 8:
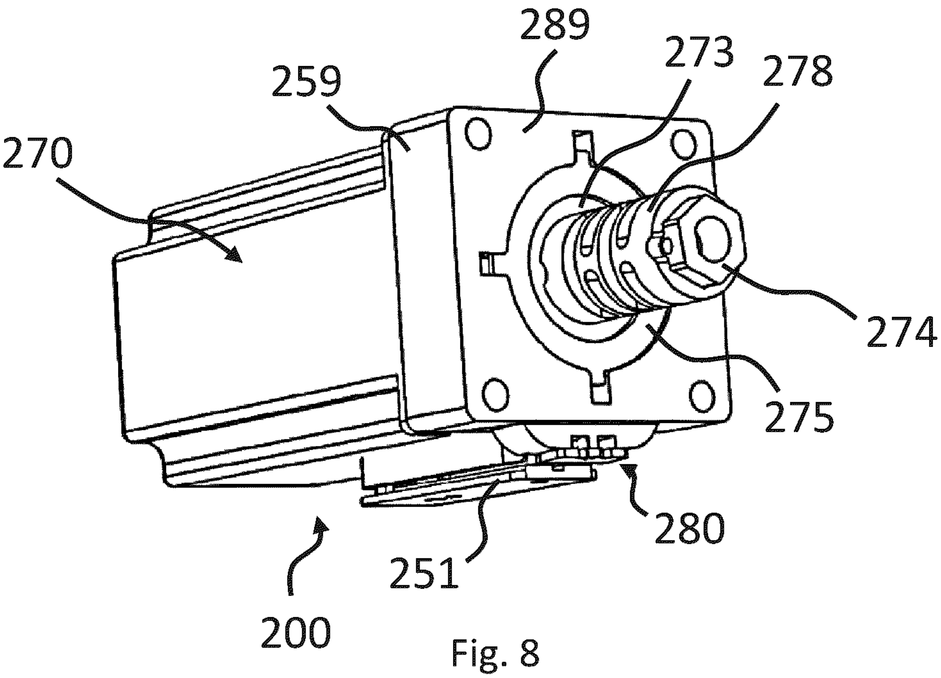
FIG. 8 is a perspective view of a locking arrangement and a motor of the drive system according to an embodiment.

FIG. 8 depicts the locking arrangement in closer detail. The locking arrangement 200 may be configured to switch from a disengaged mode in which the locking arrangement 200 does not lock the motor shaft gear 227 to an engaged mode in which the locking arrangement 200 locks the motor shaft gear 227. This may occur in response to the motor 270 switching from an operating state to a powerless state.

In one embodiment, the locking arrangement 200 may be configured to switch from the engaged mode to the disengaged mode in response to the motor 270 switching from the powerless state to the operating state.

In one embodiment, the locking arrangement may comprise a shape memory alloy element 251 and a locking device 250. The shape memory alloy element is connected to said locking device 250 and arranged to selectively actuate said locking device 250 to control a locking force on an engagement member 273. The engagement member 273 is mechanically connected to the motor 270 and the load bearing member 12 of the patient lift, i.e. the motor 270 of the patient lift and the load bearing member 12 of the patient lift. Said motor 270 is arranged to raise and lower the patient support mounting device 11.

In the engaged mode, the shape memory alloy element 251 is in a first configuration and the locking device 250 is in an engaged position for exerting a locking force on the engagement member 273 thereby preventing vertical movement of the patient support mounting device 11.

In the disengaged mode, the shape memory alloy element 251 is in a second configuration actuating the locking device 250 to a disengaged position in relation to the engagement member 273 thereby enabling vertical movement of the patient support mounting device 11.

Compared to known patient lifts implementing locking worm gear transmissions this allows for locking without creeping even when a large load is suspended by means of the patient support mounting device 11. Furthermore, the shape memory alloy allows for a more cost-efficient and less power consuming solution compared to a solenoid activated mechanical brake. Further, this allows for the locking device and the motor to form a single module. Hence, the adaptability of the drive system is further enhanced due to both the motor and locking functionality being provided in the form of a module.

A shape-memory alloy is as is known in the prior art an alloy which can be deformed in a cold state but returns to a pre-deformed shape when heated. Shape-memory alloys are also known in the prior art as memory metals, memory alloys, smart metals, smart alloys or muscle wires.

The shape memory allow element 151, 251 may be in one of: Ag—Cd, Au—Cd, Co—Ni—Al, Co—Ni—Ga, Cu—Al—Ni, Cu—Al—Ni, Cu—Al—Ni—Hf, Cu—Sn, Cu—Zn, Cu—Zn—Si, Cu—Zn—Al, Cu—Zn—Sn, Fe—Mn—Si, Fe—Pt, Mn—Cu, Ni—Fe—Ga, Ni—Ti, Ni—Ti—Hf, Ni—Ti—Pd, Ni—Mn—Ga, Ti—Nb alloy.

The shape memory alloy element 251 may be a two-way memory effect element. In the first configuration, the shape memory element 251 forms a shape which allows the locking device 250 to in the engaged position in relation to the engagement member 273. In the second configuration 251 forms a shape which is arranged to force the locking device to the disengaged position in relation to the engagement member 273.

The locking device 250 may thus be a movable by means of the shape memory alloy element 251. Accordingly, the shape memory alloy element 251 may be arranged to move the locking device 250 between the engaged position and disengaged position. The shape memory alloy element 251 may be directly attached to the locking device 250.

In one embodiment, the shape memory alloy element 251 is a muscle wire.

The shape memory alloy element 251 may be arranged to be electrically connected to at least one power source 340 for selectively transitioning between the first and second configuration.

The locking arrangement is arranged to switch from the disengaged mode to the engaged mode in response to no power being provided to the motor 270. The locking arrangement may thus function as an emergency brake which is actuated in response to the patient lift not being supplied with power. As soon as power is supplied to the motor 270 the locking arrangement switches from the engaged mode to the disengaged mode, which allows for normal operation of the patient lift.

According to an aspect, a patient lift is provided. The patient lift comprises the drive system according to any one of the previously described embodiments. The patient lift further comprises the patient support mounting device 11 and the load bearing member 12. The patient support mounting device is connected to the drive system via the load bearing member.

Figure 9:
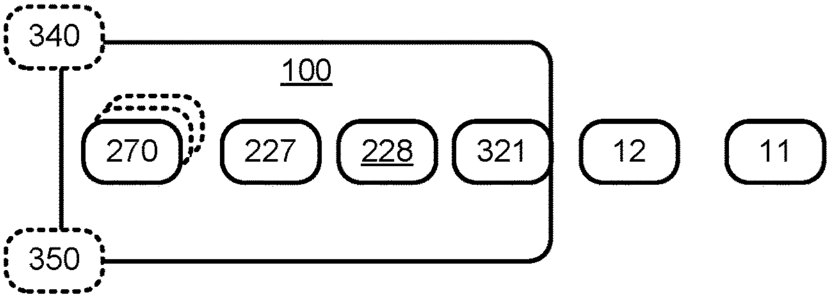
FIG. 9 is a block diagram of a drive system according to embodiments of the invention.

With reference to FIG. 9, a simplified block diagram of the drive system 100 is shown. In embodiments of the drive system 350, the at least one motor 270 is controlled by a controller 350. The controller 350 may be comprised in the drive system 100 or be provided as an external control module 350. The control module may be any suitable controller and the invention is not limited by specifics regarding the control module 350. The control module 350 will typically be operatively connected to the power source 340 and the motor(s) 270. It should be mentioned that also the power source 340 may be comprised in in the drive system 100 or external to the drive system 100. The power source 340 may be any suitable power source 340 and the skilled person will know how to implement and/or adapt the disclosed invention to function with direct current, DC, alternating current, AC, current sources or voltage sources of any level. The control module 350 may further be operatively connected to any or all other parts of the drive system 100 in order to obtain torque readings from e.g. the drum 321. The control module 350 may further be operatively connected to a user interface for controlling the patient support mounting device 11. The control module 350 may be realized using a single control system or may be implemented using a distribute system with sensors and/or controllers distributed throughout the drive system 100 and/or the patient lift. The term operatively connected is to mean any suitable connection and may be direct connection, a wired connection, a wireless connection, a connection via a BUS or a connection via active circuitry or logic.

The inventors behind this disclosure have further realized that issues may arise when controlling more than one motor 270 driving a common drum 321 as can be the case in the disclosed drive system 100. If all motors are not transferring substantially the same amount of torque to the drum 321, the motor 270 providing the most torque may actually drive any other motor 270 in the drive system 100. Consequently, the torque contributed by each motor 270 should be approximately the same for all motors 270 in the drive system unless mechanical complexity is to be added in the transferal of torque from each motor 270.

Typically, the motors 270 of drive system 100 are controlled by a current provided to them from a power source 340. The simplest way of controlling the motors 270 is to use the same controlled current for all motors 270. A preferred alternative is to control each of the motors 270 individually in order to allow e.g. current and safety limitations to be applied to each motor 270. On the other hand, having more than one motor 270 driving a common drum 321 may introduce problems as the motors 270 may contribute differently to the drive of the drum 321. One motor 270 may exert almost all torque that drives the drum 321 and the other(s) may be virtually idle when it comes to contribution of torque. This may cause added wear to the motor 270 contributing most to the drive of the drum 321. In this case, it is also preferred to control each of the motors 270 individually.

When each motor 270 is controlled individually each motor 270 is provided with an input power $P_{in}$ that can calculated as the product of a voltage $V_{in}$ and a current $I_{in}$ provided to the motor 270. The power out $P_{out}$ from the motor 270 can be described as the torque T provided by the motor 270 multiplied by the speed, Revolutions Per Minute, RPM, the revolutions of the motor 270. Since the motors 270 of the drive system 100 are joined together, they all have the same speed. Consequently, assuming the same efficiency of all motors 270, any difference in input power $P_{in}$ between the motors 270 can be attributed to a difference between the motors 270 in the torque they provide to the drum 321.

In order to mitigate these problems, a method 400 for controlling the torque exerted by each of at least two motors 270 comprised in a drive system 100 will be described with reference to FIGS. 9-11. The method 400 may be run on top of, in addition to, or as an extension to another motor control method e.g. a method for soft start, controlled braking etc. The conceptual idea of the method 400 is to ensure that the effort of driving the drum 321 is shared substantially equal between all motors 270 of the drive system 100. This will increase the life-time of the motors 270 and the drive system 100 since e.g. not one motor shaft gear 227 is subjected to more stress than the other motor shaft gears 227. Naturally, this reason applies to all parts of the drive system 100.

In order to equalize the torque provided by each motor 270, the torque exerted by each motor 270 is acquired 410. The torque may be acquired 410 directly by e.g. using a Newton meter, however, such instrumentation is costly and increases the cost of the motor 270 and/or the drive system 100. An alternative, and preferred way of acquiring 410 the torque is to estimate it based on the current provided to the motor 270. In many cases the current $I_{in}$ provided to the motor is controlled by Pulse Width Modulation, PWM, of a power source 340. From hereon, the term PWM will typically mean the duty cycle of the PWM although not specifically stated, this will be obvious to the skilled person. The power source 340 is typically a voltage source supplying a voltage $V_{in}$ that is effectively reduced by the PWM such that the input power $P_{in}$ of the inductive load of the motor 270 can be accurately controlled. Since the speed of all motors 270 is the same, the inventors have realized that a metric proportional to the torque of the motor 270 may be acquired 410 by fractioning the average current provided to the motor 270 by a duty cycle of the PWM. Hereinafter, changing, adjusting or otherwise adapting the PWM, is to mean changing the duty cycle of the PWM. Methods for measuring and averaging the input current $I_{in}$ is known to the skilled person and both analogue, e.g. low pass filtering, or digital averaging of the current may be used. In a drive system with N motors 270, the average current provided to the respective motors 270 is denoted $I_n$, and the duty cycle of the corresponding PWM is denoted $PWM_n$. Each of the currents $I_n$ is divided by the associated $PWM_n$ to a torque metric $T_n$ as shown in Eqn. 1 below.

$$T_n = I_n/\mathrm{PWM}_n \qquad \text{Eqn. 1}$$

A torque error $e_{n,m}$ can be determined 420 as the difference between a motor n and another motor m according to Eqn. 2.

$$e_{n,m} = T_n - T_m = I_n/\mathrm{PWM}_n - I_m/\mathrm{PWM}_m \qquad \text{Eqn. 2}$$

Wherein n and m reference specific motors 270 of the n motors 270. n can be any number between 1 and ∞, i.e. an arbitrary number, and consequently n and m can be any number between 1 and n.

In other words, if the drive system 100 comprises three motors 270, two torque errors $e_{n,m}$ will typically be calculated for each motor 270, that is $e_{1,2}$, $e_{1,3}$, $e_{2,1}$, $e_{2,3}$, $e_{3,1}$ and $e_{3,2}$.

In one embodiment, n in the Eqn. 2 above, always refer to the motor with the weakest torque, i.e. $T_n \leq T_m$. In this embodiment, the motor 270 contributing the least torque to the drum 321 will be regarded as the master and other motors 270 as slaves. The torque of the master is the torque that the other motors 270, the slaves, will use as target torque when controlling the torque, as will be detailed in coming sections. In this embodiment, torque errors need only be determined with reference to the weakest toque $T_n$. In order to exemplify, in the drive system with three motors 270, assume that motor #1 is contributing the least torque to the drum 321. This means that, in this embodiment, only $e_{1,2}$, $e_{1,3}$ torque errors are necessary to calculate. Note that the motor 270 determined to be the master can change during the control of the if, for instance, for one of the slaves, the PWM is at the maximum and the torque is lower than the master's torque.

The torque error may also be referenced as a torque differential value.

From the torque errors $e_{n,m}$, it is possible to determine how each motor 270 contributes to the drive of the drum 321. Different control strategies may be employed, either the motor(s) 270 contributing the most torque will have their torque decreased, or the motor(s) 270 contributing the least torque will have their torque increased. Alternatively, the strategies may be combined and the motor(s) 270 contributing the most torque will have their torque decreased and the motor(s) 270 contributing the least torque will have their torque increased such that the torque of each motor converges on an intermediate torque. Different control strategies may be employed depending on the use case. If for instance the drum 321 is in the process of lowering a patient, there would typically be a speed limitation that must not be exceeded, and this is typically linked to an upper limit in the PWM duty cycle. Once one of the motors 270 reaches this PWM limit, the other motor(s) are controlled such that they provide the same torque or reach the PWM limit. If the PWM limit is reached by the other motors without the torque being the same, the motor 270 first reaching the PWM limit is controlled to reduce its torque until it is substantially the same as the other motors.

Figure 11A:
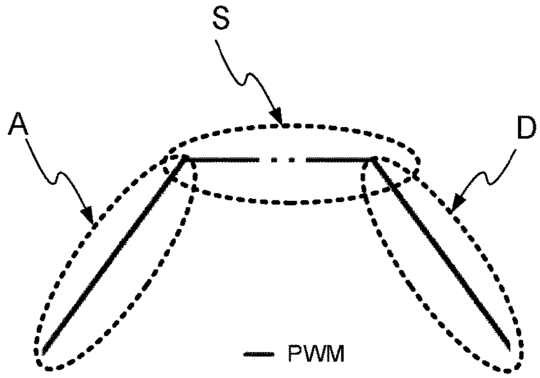
FIG. 11*a* is a time plot of a pulse width modulation provided to a motor according to embodiments of the invention.
Figure 11B:
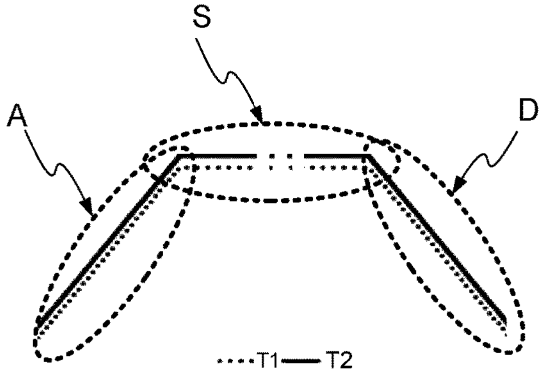
FIG. 11*b* is a time plot of exerted torque by two motors according to embodiments of the invention.

To clarify the need for control, further explanation will be provided with reference to FIGS. 11*a-b*. This explanation is given with two motors 270, but the skilled person will, after reading this disclosure, be able to expand the teachings to control more than two motors 270. The motors 270 are assumed to be of the same model and delivered according to a common specification. The drive system 100 is controlled to rotate the drum 321 such that a load, e.g. a patient, is lifted. The acceleration is controlled and is to a linear path until the desired speed is achieved at which point the acceleration stops and the speed is kept constant. The speed may be controlled by having a target PWM that corresponds to the desired speed. FIG. 11*a* illustrates how the PWM may change over time as the drum is accelerated for a first period of time A after which the speed is constant during a second period of time S until it is finally de-accelerated during a third period of time D. The PWM as illustrated in FIG. 11*a* is applied to both motors 270 and in FIG. 11*b*, the torques, T1, T2, exerted by each of the motors 270 is illustrated. The motor 270 exerting the torque T1, dotted line in FIG. 11*b*, is illustrated as exerting a lower torque than the motor 270 exerting the torque T2, solid line in FIG. 11*b*. These torques T1, T2 are, as taught in Eqn. 1, proportional to their respective currents and PWM's. Since the same PWM is supplied to both motors 270, in this example, the currents provided to each motor 270 would exhibit a behaviour similar to that of the torques T1, T2 illustrated in FIG. 11*b*. The reason for the currents, and consequently the torques, being different may be e.g. aging, malfunction, individual differences etc. As mentioned earlier, since both motors 270 are operating at the same speed, the differences seen in FIG. 11*b* result in the first motor 270, contributing less torque to the drum 321 and added wear to the second motor 270 as a result. With continued reference to FIG. 11*b*, if instead each motor 270 is controlled by an individual PWM, reducing the PWM of the second motor 270 would decrease the second torque T2, increasing the PWM of the first motor would increase the first torque T1. Consequently, by controlling the PWM based on the torque, or rather the torque error $e_{n,m}$ as explained with reference to Eqn. 2, it is possible to change the PWM such that all motors 270 contribute substantially the same torque to the drum 321.

Figure 10:
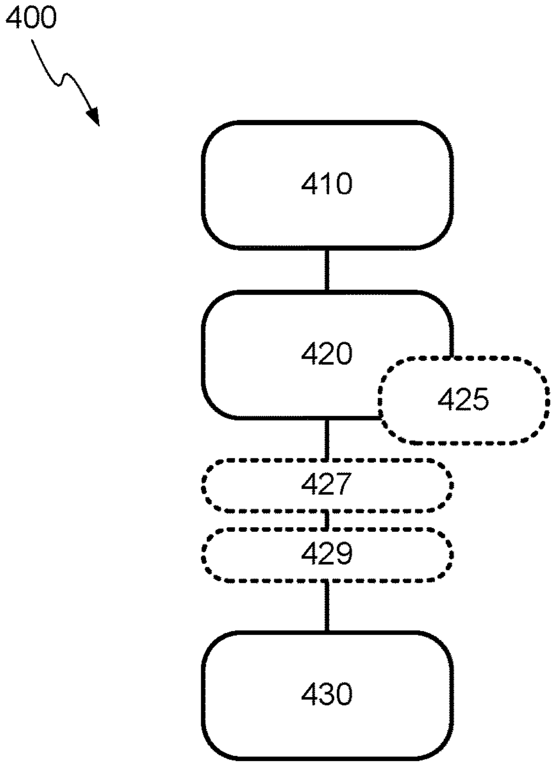
FIG. 10 is a schematic flow chart of a method for controlling a torque exerted by each of at least two motors according to embodiments of the invention.

Returning to the method 400 and FIG. 10, the determined 420 torque error is, as explained in previous sections, used to adjust 430 the torque exerted by at least one of the motors 270. The torque may, as is understood from the previous sections, be controlled by adjusting the PWM. The adjustment 430 may be accomplished by an Adjusted Power Level, APL, that is applied to the PWM associated with the motor 270 to be controlled. The APL is used as a factor on the PWM and the APL may be restricted depending on the control strategy, e.g. if no increase is allowed, the APL may be limited with 1.0 as its maximum value and if no decrease is allowed, the APL may be limited with 1.0 as its minimum value. Preferably, there will be one APL associated with each motor 270 of the drive system 100. In this disclosure, APL of 1.0 will typically correspond to no compensation and an APL lower than 1.0 correspond to a decrease of the PWM and an APL greater than 1.0 will correspond to an increase of the PWM. This is not to be considered a limiting factor and the skilled person realises that by, for instance, dividing the PWM with the APL, the reverse association will be achieved. As a starting value, the APL is preferably 1.0 and is then compensated based on the torque error $e_{n,m}$. The APL may be updated by simply subtracting the associated torque error $e_{n,m}$ from the current APL, but preferably the torque error $e_{n,m}$ is processed by a P, PI, PD or PID controller which are all known from the art.

Returning to FIG. 10 and the method 400 for controlling the torque exerted by each of at least two motors 270 comprised in the drive system 100. The method 400 may in embodiment be run continuously or a predefined or configurable number of times. The method 400 may be initiated by e.g. operation of the drive system 100 or upon detection of movement of one of the motors 270. As mentioned a torque exerted by each of the motors 270 is acquired 410. The acquired torque is used to determine 420 torque error(s) as a difference between the torque exerted by a first motor 270 of said at least two motors 270 and the torque exerted by each of the other at least two motors 270. This may be done as described above with reference to Eqn. 1 and 2. Based on the determined torque error, the torque exerted by at least one of the motors 270 is adjusted 430. The torque is adjusted in order to compensate for the determined 420 torque error. Depending on how the method 400 is implemented, the entire error may be compensated, but preferably, a controller e.g. a P, PI, PD or PID controller, is utilized in order to smoothly compensate for the torque error over a number of iterations of the method 400.

In one embodiment of the method, it further comprises, after, or as part of, the step of determining 420, a step of updating 425 the previously disclosed APL for at least one of the motors 270 of the drive system 100. In a preferred embodiment of the method 400 executed on a drive system 100 comprising two or more motors 270, the APL is updated for each of these motors 270

In a further optional embodiment, the step of adjusting 430 is performed by scaling the torque exerted by at least one of the motors 270 with the APL associated with said at least one of the motors 270.

In an optional embodiment of the method 400, the APL of each motor is limited to a maximum value of 1.0. From this follows that the torque of the motor 270 contributing the least torque to the drum 321 will be used as a target torque, i.e. motor(s) 270 contributing more torque will be associated with an APL<1.0 and consequently have their PWM and torque contributed reduced. This means determining which motor 270 contributes the least torque and reducing the torque contributed by the other motors 270 to substantially the same torque level as that of the motor 270 contributing the least torque.

In another optional embodiment of the method 400, a speed limit and/or speed target is applied to the drive system 100. The speed limit and/or speed target is typically associated with a resulting rotational speed of the drum 321 but may be any speed affected by the motors 270. In this embodiment, the method 400 further comprises, determining 427 a target current and/or a target PWM associated with the speed limit and/or speed target. This may be achieved through e.g. a predefined or configurable equation or look up table.

In a further optional embodiment, each of the motors 270 is controlled 429 based on the determined 427 target current and/or target PWM, until one of the motors 270 reaches the target current and/or the target PWM. When one of the motors 270 reaches the target current and/or the target PWM, the step of adjusting 430 is applied to only to the other motors 270, i.e. the motors of the drive system 100 not having reached the target current and/or the target PWM. The steps of determining 427 the target and controlling 429 the motors may be run integrated with the method 400 or in parallel with the method 400.

Alternatively, when controlling the speed, not all of the motors 270 are controlled to reach the determined 427 target current and/or target PWM. Any motors 270 not being targeted to reach the determined 427 target current and/or target PWM may effectively have a braking effect on the drum and act as generators (depending on the chosen type of motor 270). This may be achieved by e.g. not applying a PWM or current, or applying a PWM or current that is lower than the target current/PWM, to motors not being targeted to reach the determined 427 target current and/or target PWM.

In one optional embodiment of the method 400, no adjusting 430 for difference in torque is until the PWM for each of the motors is above 10%, preferably above 20% and most preferably above 25%. This is beneficial since the measured average current is divided by the PWM, any measurement error of the current will impact the calculated torque error $e_{n,m}$ more for lower PWM duty cycles.

In one optional embodiment of the method 400, the control of the APL is slow. This may mean that the APL or the torque error $e_{n,m}$ is averaged over a time period that is an accumulated time period of operation of the drive system 100. In this context, operation of the drive system 100 is to mean operation of at least one of the motors 270, i.e. providing a PWM with a duty cycle larger than 0 to at least one of the motors. It may be that the accumulated time period of operation is only accumulated when e.g. the PWM is above or below a PWM threshold or when the PWM is substantially constant, i.e. no acceleration of the drum 321. In a further embodiment of the method 400, the torque error is averaged over an accumulated time period of operation of the drive system 100 that is longer than 30 s, preferably longer than 60 s and most preferably longer than 120 s. In an even further embodiment, the accumulated time period of operation is only accumulated when the PWM is above 10%, preferably above 20% and most preferably above 25%.

In one optional embodiment of the method 400, the APL associated with each motor 270 is stored in a persistent manner such that it may be retrieved again after e.g. a power failure. In an alternative embodiment of the method 400, the APL associated with each motor is reset to 1.0 each time power is lost.

The method 400 may be altered, adjusted or tuned in numerous ways and the presentation above is supposed to give a general idea of the concept and is not intended to detail all thinkable variants. The embodiments presented above may be combined in any suitable way. After reading this disclosure, the skilled person will realize that for instance the APL can be limited to 1.0 such that only decrease of PWM is allowed. One of the motors 270 may be selected as a master and the other motor(s) will be controlled to adjust their respective torque to be as close as possible to the torque of the master.

The method 400 may be executed by any suitable electric circuitry or performed by a suitable controller executing software code implementing the method 400.

The described torque error $e_{n,m}$ or the presented APL may be of further use, other than ensuring that all motors 270 are contributing equally to the torque of the drum 321. If the APL is far from 1,0, this may be a sign of malfunction or ware of the system. The term far from 1.0 is vague and the skilled person will know, after reading this disclosure, what difference, error $e_{n,m}$ or APL is to be considered significant in determining the health of the system. It may be that a 10% deviation from 1.0 in the APL is significant in one system, and a 25% deviation is significant in another system. The drive system 100 may be configured to act upon a significant difference in APL or error $e_{n,m}$. A limit for acting may be predetermined or configurable and the action taken may be any suitable action e.g. generating an alert or stopping the drive system 100. The drive system 100 may further be configured to track, collect and/or log data pertaining to the exerted torque, the error $e_{n,m}$, the APL and/or any other parameter in the drive system 100 such that statistical analysis may be performed on the data.

According to an aspect, a computer program is provided. The computer program product is configured to, when executed by a control module, perform the method for controlling a torque exerted by each of at least two motors of any of the above embodiments.

CLAUSES

The scope of the invention is defined in the appended claims and the following clauses are to be considered exemplary embodiments of the invention.

Clause 1. A drive system (100) for a patient lift, the drive system comprising:
- a drum (321) configured to control the vertical movement of a patient support mounting device (11) of the patient lift via a load bearing member (12),
- at least one motor (270) adapted to drive the drum (321), each motor (270) being connected to an motor shaft gear (227),
- a control module (350) operatively connected to said at least one motor (270) and a power source (340), and
- a transmission (228) connecting the motor (270) and the drum (321), the transmission (228) being adapted to transfer torque from the motor (270) to the drum (321),
- whereby the transmission (228) comprises a transmission interface (220) adapted to interplay with the motor shaft gear (227).

Clause 2. The drive system (100) of Clause 1 wherein the transmission interface (220) is configured to receive the motor shaft gear (227) in at least two configurations, each configuration being associated with an orientation of the output motor shaft (274) relative the transmission interface (220).

Clause 3. The drive system (100) of Clause 1 or 2, wherein the control module (350) is configured to control a torque exerted by said at least one motor (270) by controlling a power supplied to said at least one motor (270) from the power source (340).

Clause 4. The drive system (100) of Clause 33 wherein the controller is further configured to obtain the torque exerted by said at least one motor (270) based on an average current and a Pulse Width Modulation, PWM, duty cycle setting provided to said at least one motor (270).

Clause 5. The drive system (100) of Clause 3 or Clause 44, wherein the control module (350) is configured to control the power supplied to said at least one motor (270) from the power source (340) substantially continuously.

Clause 6. The drive system (100) of Clause 5, wherein the control module (350) is further configured control the power supplied to said at least one motor (270) based on a control parameter comprising a product part.

Clause 7. The drive system of Clause 6, wherein the control parameter further comprises an integral part.

Clause 8. The drive system (100) of Clause 6 or Clause 77, wherein the control parameter further comprises an derivative part.

Clause 9. The drive system (100) of any of Clause 4 to Clause 8, wherein a speed limit is applied to the drive system (100), and the control module (350) is further configured to:
- determine a target current and/or a target PWM duty cycle associated with the speed limit, and
- control said at least one motor (270) until at least one motor (270) reaches the target current and/or the target PWM duty.

Clause 10. The drive system (100) according to Clause 9, wherein only one of said at least one motor (270) is controlled until it reaches the target current and/or the target PWM duty.

Clause 11. The drive system (100) of any of the preceding Clauses, comprising at least two motors (270), wherein the shaft gears (227) associated with each of said at least two motors (270) are rotating at substantially the same number of Revolutions Per Minute, RPM.

Clause 12. The drive system (100) of Clause 10, wherein the control module (350) is further configured to:
- obtain the torque exerted by each of said at least two motors (270),
- determine at least one torque differential value as a difference between the torque exerted by each of said at least two motors (270), and
- adjusting the torque exerted by at least one of said at least two motors (270) to compensate for the determined at least one torque differential value.

Clause 13. The drive system (100) of Clause 11, wherein the control module (350) is further configured to, before determining said least one torque differential value, update an Adjusted Power Level, APL, for each of said at least two motors (270).

Clause 14. The drive system (100) of Clause 12, wherein the control module (350) is configured to adjust the torque exerted by at least one of said at least two motors (270) by scaling the torque exerted by at least one of the motors (270) with the APL associated with said at least one of the motors (270).

Clause 15. The drive system (100) of any of Clause 10 to Clause 13, wherein the control module (350) is further configured to, when said at least one motor (270) reaches the target current and/or a target PWM duty cycle, adjust the torque exerted by all motors (270) except said at least one motor (270) first reaching the target current and/or the target PWM duty cycle.

Clause 16. The drive system (100) of any of Clause 10 to Clause 14, wherein the control module (350) is further configured determine which motor (270) contributes the least torque and adjust reduce the torque exerted by each of the other motors (270) to substantially the same torque as the torque contributed by the motor (270) contributing the least torque.

Clause 17. The drive system (100) of any of Clause 1010 to Clause 16, wherein the torque exerted by each of the motors (270) is controlled by the control module (350) based on at least a PWM duty cycle, and the control module (350) is further configured to start adjusting the torque exerted by at least one of said at least two motors (270) when the PWM duty cycle for each of the motors is above 10%, preferably above 20% and most preferably above 25%.

The invention has been described above in detail with reference to embodiments thereof. However, as is readily understood by those skilled in the art, other embodiments are equally possible within the scope of the present invention, as defined by the appended claims.

The invention claimed is:

1. A drive system for a patient lift, the drive system comprising:

a drum configured to control a vertical movement of a patient support mounting device of the patient lift via a load bearing member;

at least one motor adapted to drive the drum, each motor of the at least one motor being connected to a motor shaft gear via an output motor shaft; and a transmission connecting the at least one motor and the drum, the transmission being adapted to transfer torque from the at least one motor to the drum, wherein the transmission comprises a transmission interface adapted to interplay with the motor shaft gear, wherein the transmission interface is configured to receive the motor shaft gear in at least two configurations, each configuration being associated with an orientation of the output motor shaft relative the transmission interface, wherein the transmission interface comprises an input transmission gear adapted to interplay with the motor shaft gear, wherein the transmission comprises an output gear fixed to the drum, the output gear being connected to the transmission interface for receiving torque from the motor shaft gear, wherein the motor shaft gear and the input transmission gear form a worm drive, and wherein the motor shaft gear is a worm gear and the input transmission gear is a worm wheel.

2. The drive system according to claim 1, wherein the output gear comprises a ring wheel fixed to the drum.

3. The drive system according to claim 1, wherein the output motor shaft has an orientation which is orthogonal to the drum in the at least two configurations.

4. The drive system according to claim 1, wherein the at least one motor comprises a first motor and a second motor, wherein the transmission interface is adapted to interplay with a first motor shaft gear connected to the first motor via a first output motor shaft and a second motor shaft gear connected to the second motor via a second output motor shaft.

5. A patient lift comprising the drive system according to claim 1, the patient support mounting device and the load bearing member, the patient support mounting device being connected to the drive system via the load bearing member.

6. A method for the drive system for the patient lift according to claim 4 to control the vertical movement of the patient support mounting device, the method comprising:

obtaining a torque exerted by each of the first motor and the second motor;

determining at least one torque differential value as a difference between the torque exerted by each of the first motor and the second motor; and adjusting the torque exerted by at least one of the first motor and the second motor to compensate for the determined at least one torque differential value.

7. The method according to claim 6, wherein the first motor and the second motor are operating at a same speed.

8. The method according to claim 6, further comprising, after the step of determining, a step of updating an Adjusted Power Level, APL, for each of the first motor and the second motor, and the step of adjusting is performed by scaling the torque exerted by at least one of the first motor and the second motor with the APL associated with said at least one of the first motor and the second motor.

9. The method according to claim 6, wherein obtaining the torque exerted by each of the first motor and the second motor is based on an average current and a Pulse Width Modulation, PWM, duty cycle setting provided to control the respective motor.

10. The method according to claim 9, wherein the drive system is arranged with a speed limit, and wherein the method further comprises, before the step of adjusting: determining a target current and/or a target PWM duty cycle associated with the speed limit, and controlling at least one of the first motor and the second motor to reach the target current and/or the target PWM duty cycle.

11. The method according to claim 6, wherein the method is repeated continuously, and wherein the adjusting is based on a control parameter comprising a product part, an integral part and a derivative part of the determined at least one torque differential value.

12. The method according to claim 6, wherein the step of determining further comprises determining which motor of the first motor and the second motor contributes the least torque, and wherein the step of adjusting comprises reducing the torque exerted by one of the first motor or the second motor to substantially the same torque as the torque contributed by the other one of the first motor or the second motor contributing the least torque.

13. A computer program product comprising instructions which, when executed by a control module, cause the control module to carry out the method of claim 6.

14. A method for a drive system for a patient lift to control a vertical movement of a patient support mounting device, wherein the drive system includes a drum configured to control the vertical movement of the patient support mounting device of the patient lift via a load bearing member, at least two motors adapted to drive the drum, each motor of the at least two motors being connected to a motor shaft gear via an output motor shaft, and a transmission connecting each motor and the drum, the transmission being adapted to transfer torque from each motor to the drum, wherein the transmission comprises a transmission interface adapted to interplay with the motor shaft gear, wherein the transmission interface is configured to receive the motor shaft gear in at least two configurations, each configuration being associated with an orientation of the output motor shaft relative the transmission interface, wherein the transmission interface comprises an input transmission gear adapted to interplay with the motor shaft gear, wherein the transmission comprises an output gear fixed to the drum, the output gear being connected to the transmission interface for receiving torque from the motor shaft gear, and wherein the motor shaft gear and the input transmission gear form a worm drive, the method comprising:

obtaining a torque exerted by each motor of the at least two motors;

determining at least one torque differential value as a difference between the torque exerted by each motor of the at least two motors; and adjusting the torque exerted by at least one motor of the at least two motors to compensate for the determined at least one torque differential value.

15. The method according to claim 14, wherein the at least two motors are operating at a same speed.

16. The method according to claim 14, further comprising, after the step of determining, a step of updating an Adjusted Power Level, APL, for each motor of the at least two motors, and the step of adjusting is performed by scaling the torque exerted by at least one motor of the at least two motors with the APL associated with said at least one motor of the at least two motors.

17. The method according to claim 14, wherein obtaining the torque for each motor of the at least two motors is based on an average current and a Pulse Width Modulation, PWM, duty cycle setting provided to control the respective motors.

18. The method according to claim 17, wherein the drive system is arranged with a speed limit, and wherein the method further comprises, before the step of adjusting: determining a target current and/or a target PWM duty cycle associated with the speed limit, and controlling at least one motor of the at least two motors until the at least one motor reaches the target current and/or the target PWM duty cycle.

19. The method according to claim 14, wherein the method is repeated continuously, and wherein the adjusting is based on a control parameter comprising a product part, an integral part and a derivative part of the determined at least one torque differential value.

20. The method according to claim 14, wherein the step of determining further comprises determining which motor of the at least two motors contributes the least torque, and wherein the step of adjusting comprises reducing the torque exerted by each of the other motors to substantially the same torque as the torque contributed by the motor contributing the least torque.

21. A computer program product comprising instructions which, when executed by a control module, cause the control module to carry out the method of claim 14.

* * * * *